United States Patent
Chu et al.

(10) Patent No.: US 10,081,466 B2
(45) Date of Patent: Sep. 25, 2018

(54) CASE WITH DEVICE FOR TOOL FREE UNLOCKING ACCESS

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wei-Sin Chu, New Taipei (TW); Ming-Tsz Lin, New Taipei (TW); Feng-Jung Yang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 128 days.

(21) Appl. No.: 15/240,326

(22) Filed: Aug. 18, 2016

(65) Prior Publication Data
US 2018/0050851 A1    Feb. 22, 2018

(51) Int. Cl.
*B65D 55/02*    (2006.01)
*B65D 25/28*    (2006.01)
*B65D 43/26*    (2006.01)

(52) U.S. Cl.
CPC ............ *B65D 55/02* (2013.01); *B65D 25/28* (2013.01); *B65D 43/26* (2013.01); *B65D 2525/284* (2013.01)

(58) Field of Classification Search
CPC ........ B65D 55/02; B65D 43/26; B65D 25/28; B65D 2525/284; E05B 65/0014
USPC ............. 220/324, 326; 292/65, 303, DIG. 11
See application file for complete search history.

(56) References Cited

U.S. PATENT DOCUMENTS

| 2,225,722 | A | * | 12/1940 | Spieth | ............... F24D 19/06 220/324 |
| 4,068,872 | A | * | 1/1978 | Smith | ............... E05B 53/001 292/255 |
| 4,717,184 | A | * | 1/1988 | Boyce | ............... E05B 65/0014 292/262 |
| 4,854,448 | A | * | 8/1989 | Hair, II | ............... E05B 65/0014 206/1.5 |
| 4,993,762 | A | * | 2/1991 | Rogers | ............... E05B 37/20 292/303 |
| 2009/0066203 | A1 | * | 3/2009 | Zielinski | ............ E05B 65/0014 312/222 |

FOREIGN PATENT DOCUMENTS

| CN | 2735421 Y | 10/2005 |
| CN | 202183925 U | 4/2012 |
| TW | M325714 | 1/2008 |
| TW | I341967 | 5/2011 |
| TW | M456054 | 6/2013 |

* cited by examiner

*Primary Examiner* — James N Smalley
(74) *Attorney, Agent, or Firm* — ScienBiziP, P.C.

(57) ABSTRACT

A container case with locking device which allows tool-free unlocking and access includes a top cover having a latching protrusion, a base with sliding top cover, and a handle assembly fixed on the base. The handle assembly includes a resilient catch plate and a handle portion having an operating portion and an elastic arm. When the operating portion is forced by a thumb or finger, the latching protrusion is released from the elastic arm and the handle portion, and the top cover can slide free. When top cover is replaced, the latching protrusion slides and forces back the catch plate until the latching protrusion is again latched by the catch plate and the handle portion. The handle assembly is on the side plate of the base, operators need to use only one thumb or finger to open the top cover.

12 Claims, 7 Drawing Sheets

CASE WITH DEVICE FOR TOOL FREE UNLOCKING ACCESS

FIELD

The subject matter herein generally relates to locking devices, and more particularly to a case with tool free unlocking device.

BACKGROUND

Cases, such as a server, a storage, or the like, need a tool for regular hardware installation and maintenance. The most common structure is an elastic handle on a top cover of the cases for unlocking the case to access the hardware or components inside. The top cover of the cases can slide to open through the use of an elastic handle. There is a limit to the size of components and visible access to the components in such cases. Additionally, operators need to have both hands on the elastic handle to apply sufficient force to open the cases. Therefore, there is room for improvement in the art.

BRIEF DESCRIPTION OF THE DRAWINGS

Implementations of the present technology will now be described with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like reference numerals indicate the same or similar elements. It should be noted that references to "an" or "one" exemplary embodiment in this disclosure are not necessarily to the same exemplary embodiment, and such references can mean "at least one."

Figure 1:
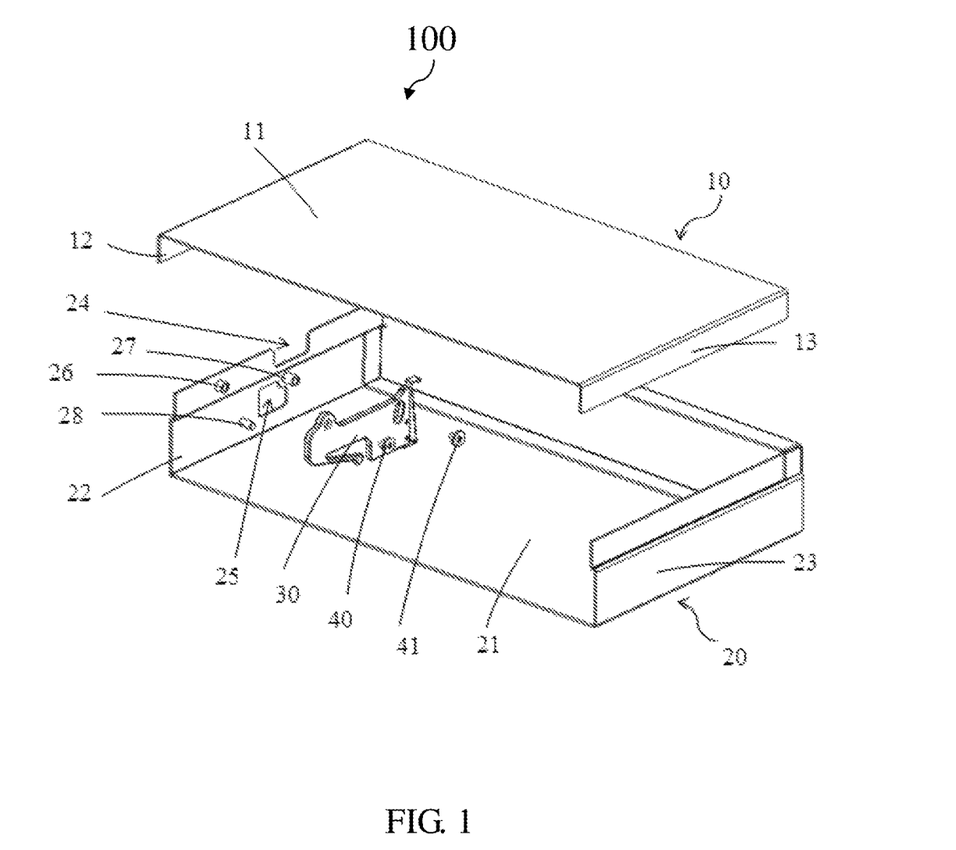
FIG. 1 is an exploded isometric view of an exemplary embodiment of a case.

FIG. 1 shows an exemplary embodiment of a case 10. The case includes a top cover 10, a base 20, and a handle assembly 30. The top cover 10 can slide relative to the base 20. The handle assembly 30 is secured to the base 20. The top cover 10 includes a top plate 11. A first side plate 12 and a second side plate 13 extend from opposite ends of the top plate 11, the first side plate 12 includes a latching protrusion 14 (shown in FIG. 4).

The base 20 includes a bottom plate 21, a third side plate 22, and a fourth side plate 23 extending from opposite ends of the bottom plate 21. The third side plate 22 opposite to the first side plate 12 has a sliding groove 24, a receiving groove 25, a first connecting portion 26, a second connecting portion 27, and a stopper portion 28. The sliding groove 24 comprises of an open end to accommodate and receive the latching protrusion 14. In the exemplary embodiment, the first connecting portion 26 and the second connecting portion 27 can be a protruding portion or a cylinder with a female screw portion extending from the internal side of the third side plate 22. The first connecting portion 26 and the second connecting portion 27 are spaced apart from each other. The first connecting portion 26, the second connecting portion 27, and the stopper portion 28 are positioned around the receiving groove 25. The base 20 can further include a front board and a back board (not shown in figures).

Figure 2:
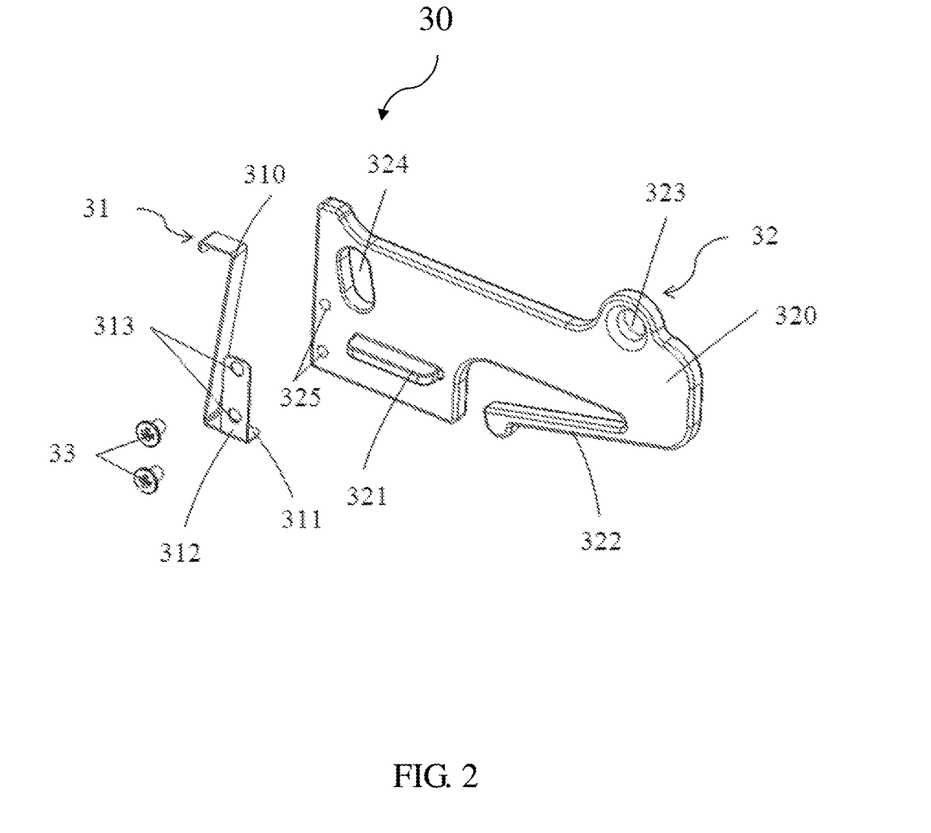
FIG. 2 is an exploded isometric view of a handle assembly of the case in FIG. 1.

Referring to FIG. 1 and FIG. 2, the handle assembly 30 includes a resilient catch plate 31 and a handle portion 32 fixed to the catch plate 31. The catch plate 31 includes an L shaped actuating part 310, a middle portion 311 extending from the end of the actuating part 310 at a certain angle, the certain angle the actuating part 310 and the middle portion 311 formed is close to 90 degree and less than 90 degree, and a connect piece 312 extending from one side of the middle portion 311 and is perpendicular to the middle portion 311. The middle portion 311 connects the actuating part 310 and the connecting piece 312. The actuating part 310, the middle portion 311, and the connecting piece 312 are each positioned in three independent planes. The connecting piece 312 comprises of a connect aperture 313. The handle portion 32 includes a body 320, an operating portion 321, and an elastic arm 322. The actuating part 310 engages with the body 320 to latch onto the latching protrusion 14. The middle portion 311 connects the actuating part 310 and the connecting piece 312 through the connect aperture 313, and the connecting piece 312 is connected with the body 320. The middle of the body 320 is shaped to be lower in the middle than at the two ends, with a smooth transition from the higher position to the lower position to allow the latching protrusion 14 to move smoothly. The body 320, the operating portion 321, and the elastic arm 322 form a single structure. The operating portion 321 extends perpendicularly away from the body 320. The elastic arm 322 extends from one side of the bottom end of the body 320 with one end hanging in the air. The elastic arm 322 extends from the body 320 and acts as a supporting point for the body 320. The elastic arm 322 is stationary and moves when pushed by a thumb or finger. The elastic arm 322 faces away from the body 320 and has a hook to prevent the stopper portion 28 from moving away from the elastic arm 322. The elastic arm 322 is substantially coplanar with the body 320. The body 320 comprises a first through hole 323 which is round, a second through hole 324 having a strip shape, and a fixed hole 325. The operating portion 321 is near the second through hole 324 and away from the first through hole 323. The fixed member 33 passes through the connect aperture 313 of the connect piece 312 and connects with the fixed hole 325 of the body 320. When the top cover 10 is not engaged with the base 20, the long side of the actuating part 310 of the catch plate 31 and the body 320 are at a certain angle of inclination. The actuating part 310 is higher than the body 320, the long side of the actuating part 310 resist against the top end of the body 320, and the catch plate 31 is higher than the handle portion 32. The connect piece 312 can be bolted or welded on the body 320.

Figure 3:
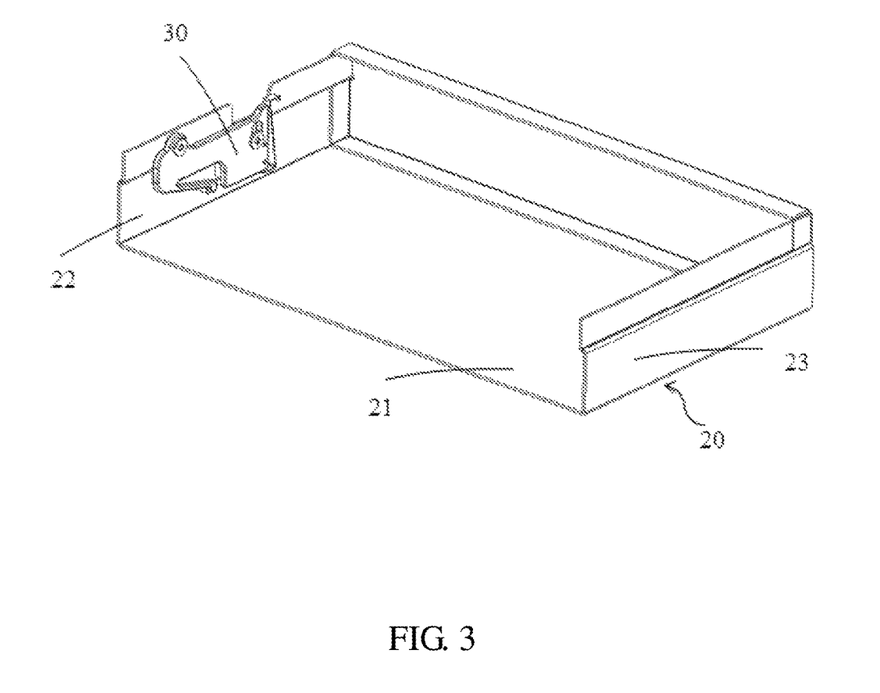
FIG. 3 is an exploded isometric view of the case in FIG. 1 without a top cover.

Referring to FIG. 1 to FIG. 3, when assembling the case 100, the operating portion 321 passes through the receiving groove 25 and extends out from the receiving groove 25. The stopper portion 28 under the elastic arm 322 resists the hook of the elastic arm 322 to prevent the stopper portion 28 moving away from the elastic arm 322. The first connecting portion 40 passes through the first through hole 323 to engage the first through hole 323 with the first connecting portion 26. The second connecting portion 41 passes through the second through hole 324 to engage the second through hole with the second connecting portion 41. When the base is assembled, the second connecting portion 41 is close to the lowest position of the second through hole 324. The handle assembly 30 is assembled with the third side plate 22 of the base 20. The first side plate 12 engages with the third side plate 22 and the second side plate 13 engages with the fourth side plate 23. The latching protrusion 14 moves into the sliding groove 24 of the case 100. The handle assembly 30 operates by sliding the top cover 10 to open or close the case 100 after the case 100 is assembled.

FIG. 1 to FIG. 7 show in detail how to open or close the top cover 10 of the case 100 according to this exemplary embodiment.

Figure 4:
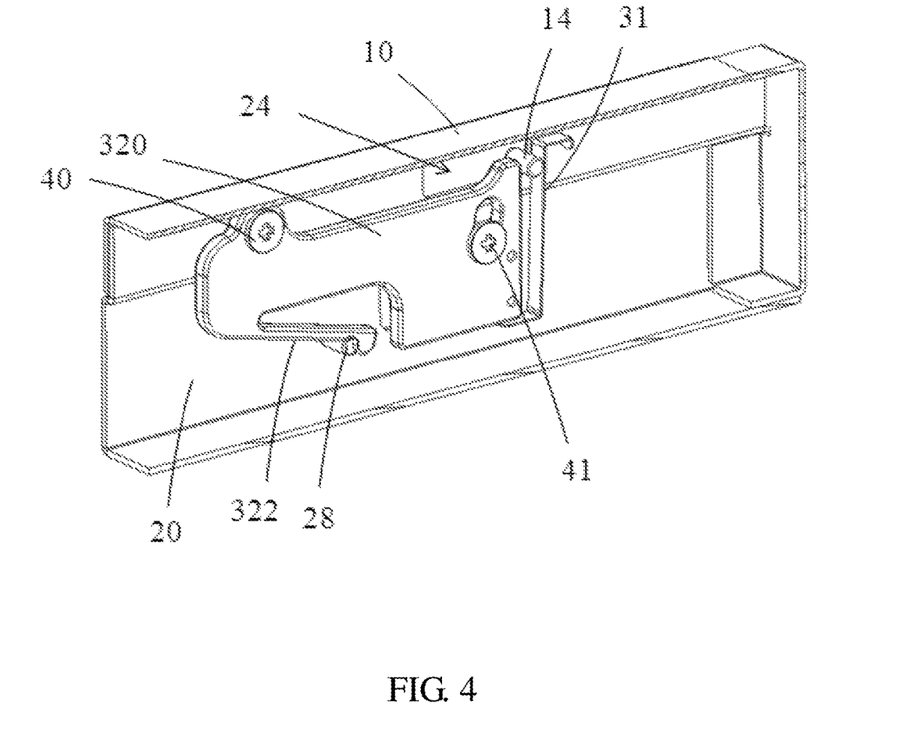
FIG. 4 is an isometric view showing a means of opening of the top cover, and the top cover completely closed.

FIG. 4 shows the initial condition of the top cover 10 when locked with the base 20. The latching protrusion 14 is locked into the gap between the catch plate 31 and the body 320. The second connector 41 is located on the lowest position of the second through hole 324, and the operating portion 321 is located on the top of the receiving groove 25.

Figure 5:
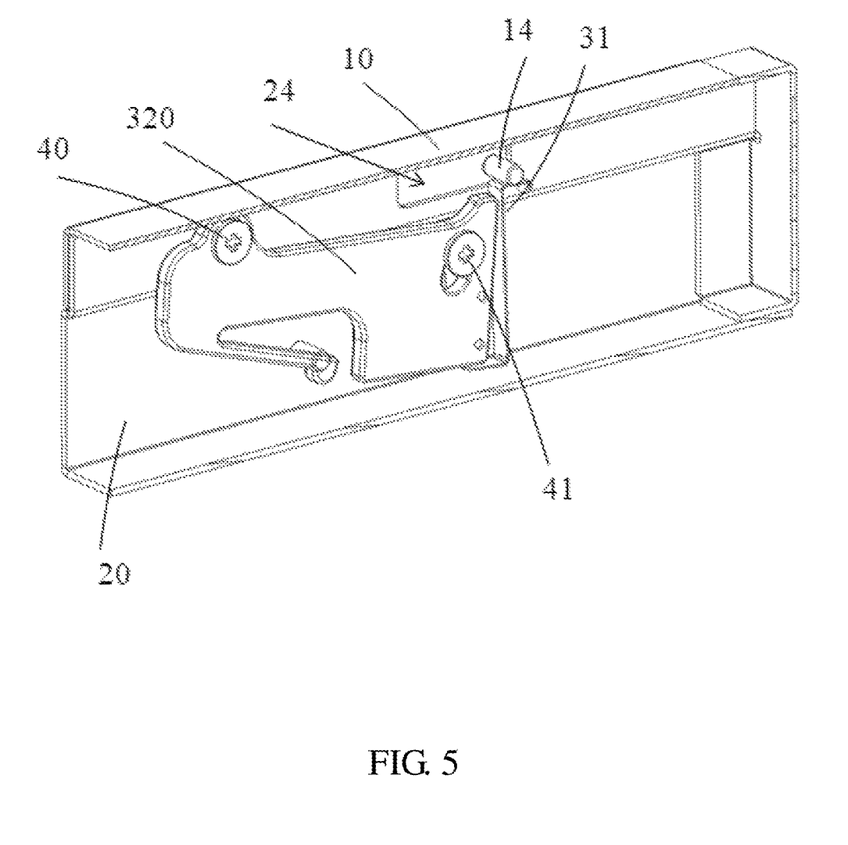
FIG. 5 is an isometric view of the top cover during opening.

The operating portion 321 is moved downward to open the top cover 10. The body 320 moves down by the operating portion 321, and the top end of the second through hole 324 comes into contact with the second connector 41. The elastic arm 322 is pressed, the stopper portion 28 resists movement and makes a clicking noise. The latching protrusion 14 separates from the gap between the body 320 and the catch plate 31, and the latching protrusion 14 is positioned on the right of the receiving groove 25. The sliding groove 24 is deeper than the difference in length between the long side of the actuating part 310 and the body 320 close to the catch plate 31. This ensures that the latching protrusion 14 is located between the body 320 and the catch plate 31 when locked. The sliding groove 24 limits the horizontal movement of latching protrusion 14, and the receiving groove 25 limits the vertical movement of the operating portion 321. The handle portion 320 pivots around the first through hole 323, and an angle range of the handle portion 320 is determined by the movement of the operating portion 321 in the receiving groove 25. The elastic arm 322 returns to the initial position when loosen the operating portion 321, the short side of the actuating part 310 contacts and resists against the latching protrusion 14 to prevent the latching protrusion 14 from moving out of the handle assembly 30 (as shown in FIG. 5).

Figure 6:
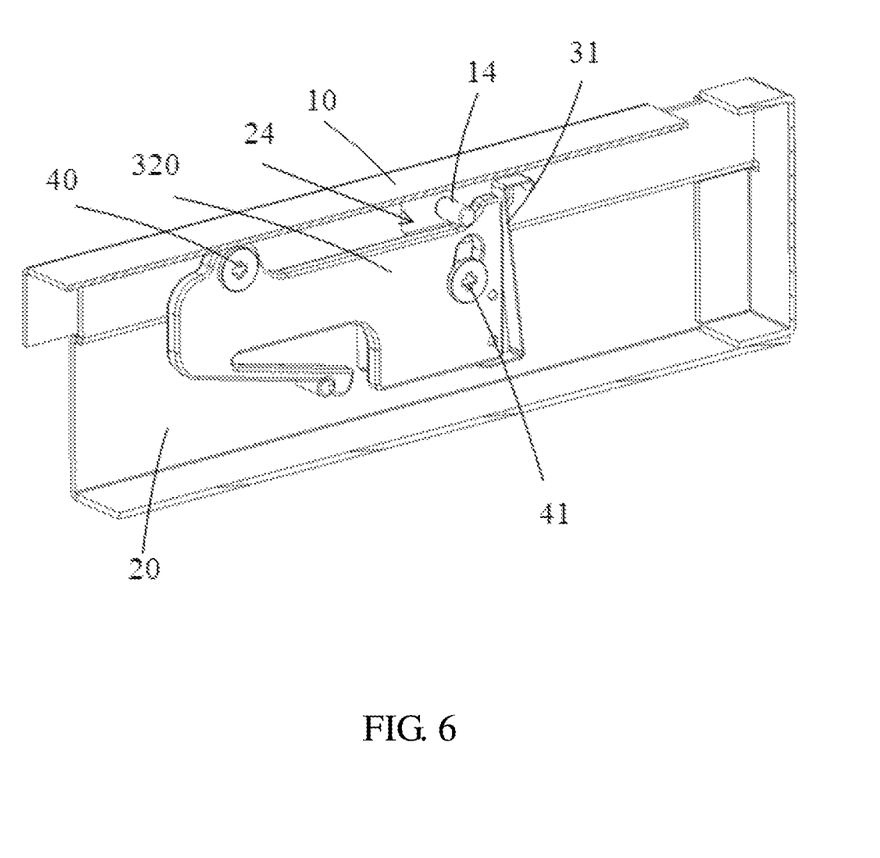
FIG. 6 is an isometric view of the top cover completely opened and before closing.

The top cover 10 slides along the receiving groove 25, since the catch plate 31 is higher than the body 320, the latching protrusion 14 can smoothly cross the handle portion 32. Since the body 320 is lower in the middle than at the two ends, with smooth transition from higher to lower positions, the latching protrusion 14 can move smoothly to the lower position of the body 320 (as shown in FIG. 6). This allows the top cover 10 is easily opened.

Figure 7:
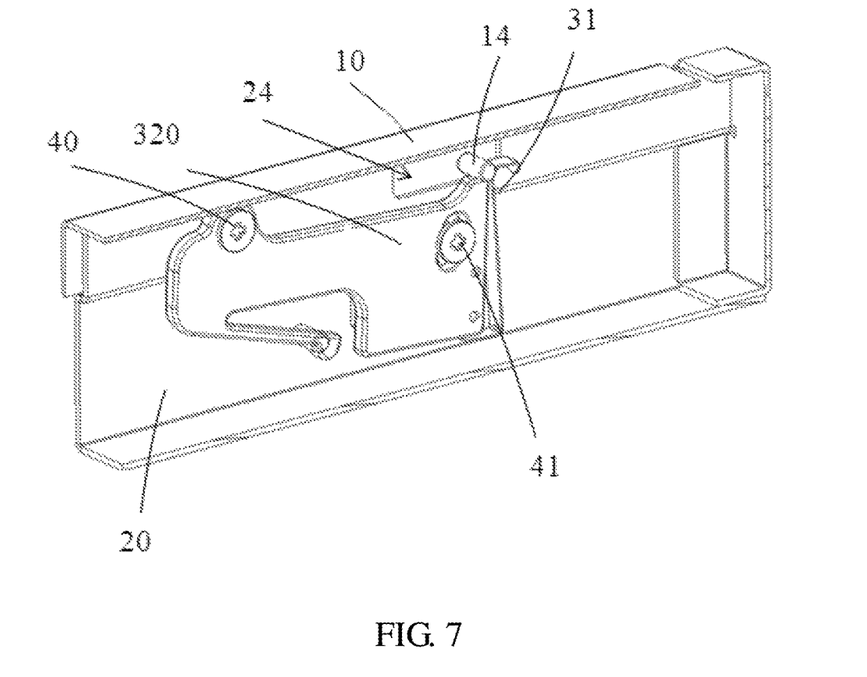
FIG. 7 is an isometric view of the top cover during closing.

When closing the top cover 10, the latching protrusion 14 is positioned on the lower position of the body 320 closer to the first through hole 323. The closing of the top cover 10 works in reverse to opening the top cover 10. The latching protrusion 14 reaches the highest position on the right hand side of the body 320, the body 320 near the latching protrusion 14 moves down, and the elastic arm 322 is in an elastically deformed state resisted by the stopper portion 28. The top cover 10 is sliding further away from the first through hole 323, and since the catch plate 31 is higher than the body 320, the latching protrusion 14 contacts and pushes against the catch plate 31 (as shown in FIG. 7). The catch plate 31 is pushed back by the latching protrusion 14. The actuating part 310 of the catch plate 31 resists movement, and a gap is formed to accommodate the latching protrusion 14. The elastic arm 322 returns to the initial position, the latching protrusion 14 is positioned in the gap, and the second connector 41 contacts the bottom end of the second through hole 324. The actuating part 310 of the catch plate 31 and the body 320 latch onto the latching protrusion 14, and the top cover is thus locked with the base 20 (as shown in FIG. 4).

The structure of this embodiment avoids providing a handle on the top cover, and an operator is not required to have both hands on the elastic handle to apply a strong force.

The exemplary embodiments shown and described above are only examples. Many details are often found in the art such as the other features of case with device for tool free unlocking access. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A case with device for tool free unlocking access, comprising:
   a top cover having a latching protrusion;
   a base with the top cover sliding relative to the base;
   a handle assembly fixed to the base, wherein the handle assembly comprises:
   a catch plate; and
   a handle portion having an operating portion and an elastic arm;
   wherein when the operating portion is forced by an external force, the latching protrusion moves away from the catch plate and the handle portion, and the top cover slides away from the base; when the top cover slides away from the base, the catch plate is pressed by the latching protrusion, the latching protrusion is locked between the catch plate and the handle portion by the elastic arm resisting force, and the top cover latches to the base.

2. The case with device for tool free unlocking access of claim 1, wherein the top cover comprises a top plate, a first side plate and a second side plate, the latching protrusion is on one of the first side plate or the second side plate, the base comprises a bottom plate, a third side plate, a fourth side plate, and wherein one of the third side plate or the fourth side plate has a sliding groove, a receiving groove, and a stopper portion.

3. The case with device for tool free unlocking access of claim 1, wherein the catch plate is higher than the handle portion, the catch plate is fixed on the handle portion, the handle portion has a body, the operating portion and the elastic arm extend from the body, the body defines a first through hole and a second through hole.

4. The case with device for tool free unlocking access of claim 2, wherein the latching protrusion passes through the sliding groove, the operating portion passes through the receiving groove, the stopper portion is positioned under the elastic arm and resisted with the elastic arm.

5. The case with device for tool free unlocking access of claim 3, further comprising a first connector and a second connector, wherein one of the third side plate or the fourth side plate has a first connecting portion and a second connecting portion, the first connector passes through the first through hole to connect with the first connecting portion, the second connector passes through the second through hole to connect with the second connecting portion.

6. The case with device for tool free unlocking access of claim 3, wherein the catch plate comprises an actuating part, a middle portion, and a connecting piece, the actuating part is higher than the body.

7. The case with device for tool free unlocking access of claim 3, wherein the actuating part contacts the body and with elastic deformation to form a gap when resisted by the latching portion, and the latching protrusion is locked into the gap between the catch plate and the body, the actuating part is higher than the body.

8. The case with device for tool free unlocking access of claim 3, wherein the top end of the body defines a curved surface, and the elastic arm extends from one side of the bottom end of the body.

9. The case with device for tool free unlocking access of claim 3, wherein the elastic arm is positioned away from the body and has a hook to prevent the stopper portion from moving away from the elastic arm.

10. The case with device for tool free unlocking access of claim 2, wherein the sliding groove defines an open end to accommodate the latching protrusion, and the sliding groove limits the latching protrusion from moving.

11. The case with device for tool free unlocking access of claim 2, wherein the sliding groove limits the latching protrusion from moving along the horizontal direction, the receiving groove limits the operating portion from moving along the vertical direction, and the handle portion rotates around the first through hole.

12. The case with device for tool free unlocking access of claim 6, wherein the actuating part, the middle portion, and the connecting piece are each positioned in three independent planes, the actuating part engages with the body to clip onto the latching protrusion, the middle portion connects between the actuating part and the connecting piece, and the connecting piece couples to the body.

* * * * *